United States Patent [19]

Gilham et al.

[11] 4,209,832

[45] Jun. 24, 1980

[54] COMPUTER-GENERATED DISPLAY FOR A FIRE CONTROL COMBAT SIMULATOR

[75] Inventors: Arthur W. S. Gilham, Sterling Heights; Stuart W. Flockencier, Chesterfield Twp., Macomb County, both of Mich.

[73] Assignee: Chrysler Corporation, Highland Park, Mich.

[21] Appl. No.: 915,323

[22] Filed: Jun. 13, 1978

[51] Int. Cl.² .............................................. G06F 3/14
[52] U.S. Cl. ...................................... 364/521; 35/25; 340/721; 340/725; 358/104; 364/423; 364/528; 364/900
[58] Field of Search ............... 364/423, 514, 515, 518, 364/520–523, 526, 578, 200, 900; 340/721, 725, 747; 35/25; 358/104, 903, 22

[56] References Cited

U.S. PATENT DOCUMENTS

| | | | |
|---|---|---|---|
| 3,537,096 | 10/1970 | Hatfield | 340/725 |
| 3,603,964 | 9/1971 | Harrison | 340/725 |
| 3,723,803 | 3/1973 | Harrison et al. | 340/725 |
| 3,747,087 | 6/1971 | Harrison et al. | 340/725 |
| 3,895,357 | 7/1975 | Schwartz et al. | 364/200 |
| 3,944,997 | 3/1976 | Swallow | 340/747 |
| 3,973,244 | 8/1976 | Lovercheck et al. | 364/200 |
| 4,021,841 | 5/1977 | Weinger | 358/22 |
| 4,026,555 | 5/1977 | Kirschner et al. | 340/725 |
| 4,070,710 | 1/1978 | Sukonick et al. | 340/721 |
| 4,116,444 | 9/1978 | Mayer et al. | 364/521 |

OTHER PUBLICATIONS

Knowlton, K. C.; "Computer-Produced Movies"; Science; vol. 150, Nov. 26, 1965; pp. 1116–1120.

*Primary Examiner*—Errol A. Krass
*Attorney, Agent, or Firm*—Baldwin & Newtson

[57] ABSTRACT

Electronic generation of the display is accomplished by a system which includes a host computer, a plurality of object generators, and related circuitry. Each object generator contains a memory which stores the image of an object which may be displayed on the video display. The host computer assigns locations in the scene to the objects of each object generator. Each object generator includes its own microprocessor which performs calculations based on its own object information and position and range information received from the host computer to provide appropriate video signals for the display. The related circuitry of the system includes a blanking and count generator which provides signals whereby the color video information from the object generator is displayed on the video display and it also establishes times for permitting updating of the information between the host computer and the object generators. Further features include a priority chain linking the object generators which, if an overlap situation occurs where more than one object generator is calling for its information to be displayed in the same location on the video display, the object which has been assigned a higher priority, indicating that it is at a closer range than others, has its overlap information displayed on the video display instead of those of lower priority. Another feature is the data compression scheme employed to store the object image in each object generator.

6 Claims, 12 Drawing Figures

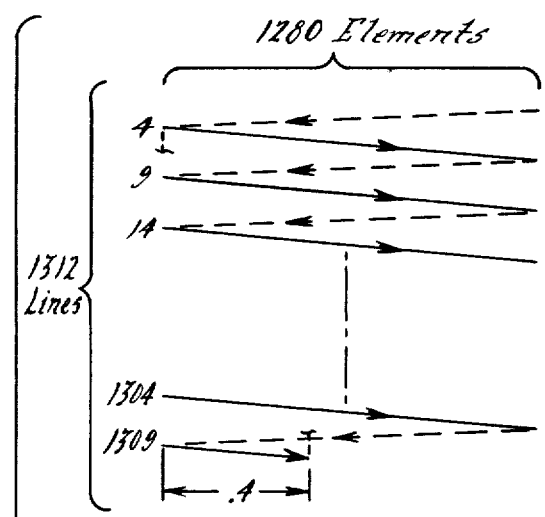
Field 1
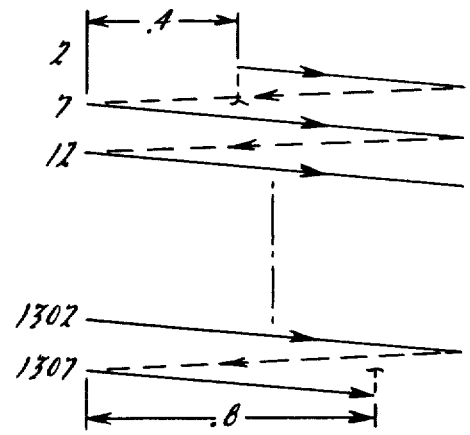
Field 2
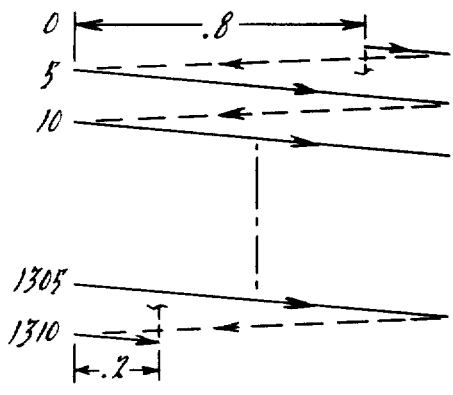
Field 3
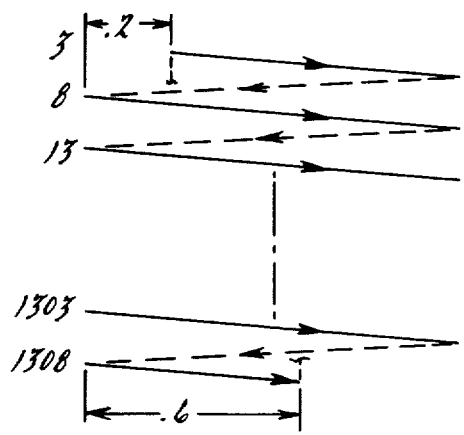
Field 4
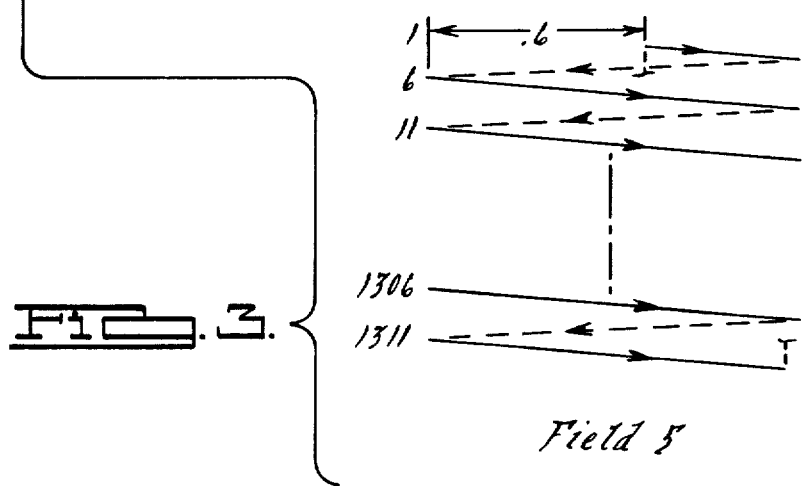
Field 5
FIG. 3.

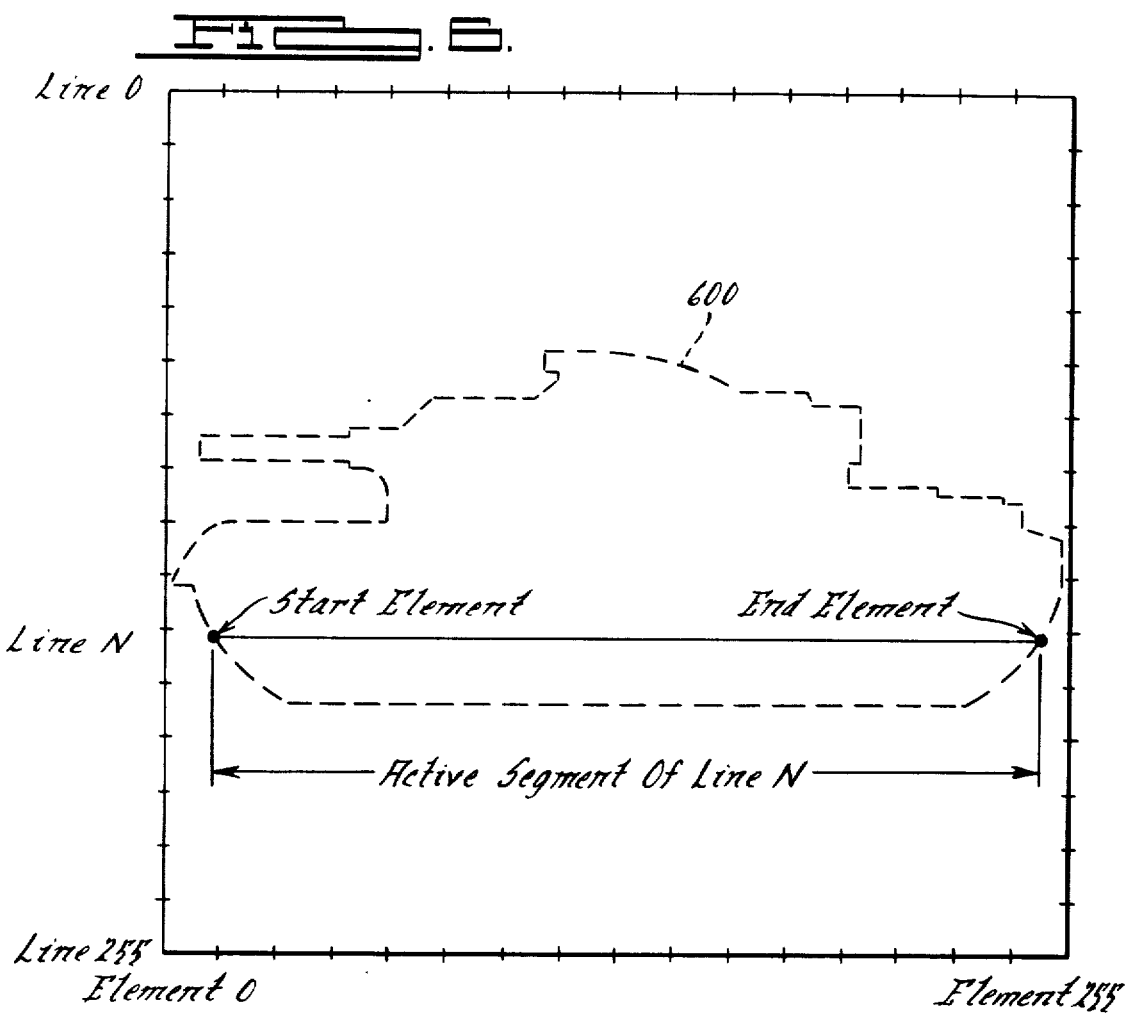
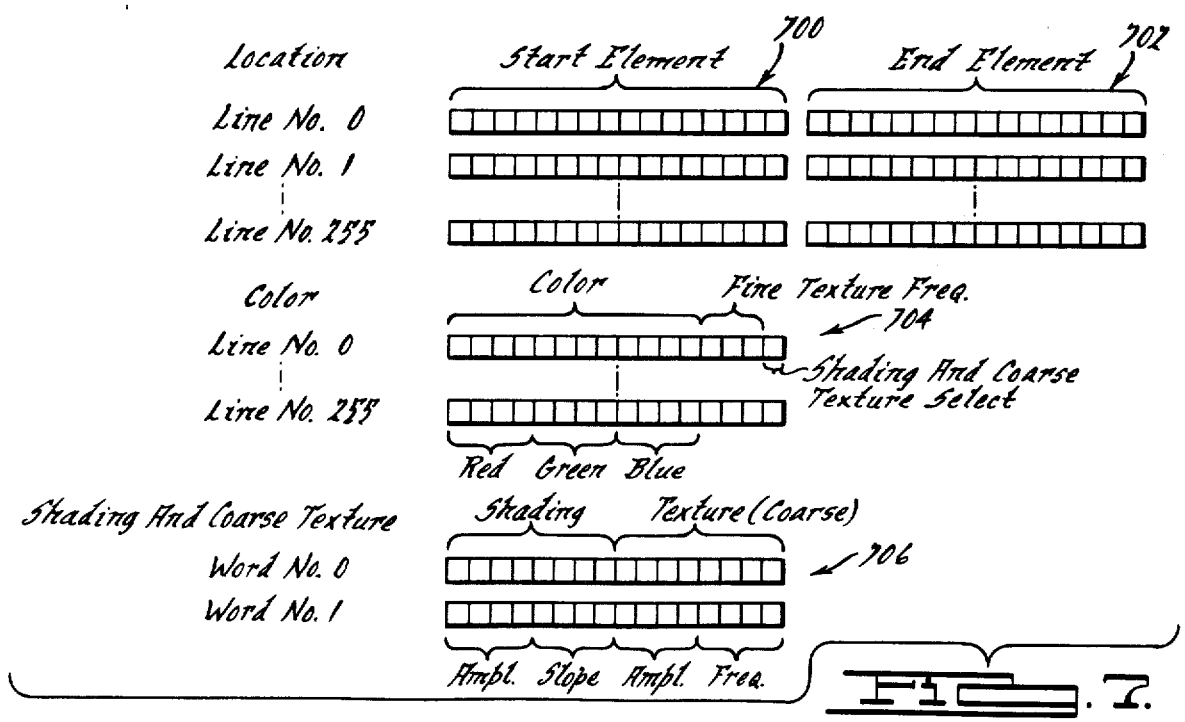

COMPUTER-GENERATED DISPLAY FOR A FIRE CONTROL COMBAT SIMULATOR

BACKGROUND AND SUMMARY OF THE INVENTION

This invention pertains to a computer-generated display which is disclosed in the preferred embodiment of a fire control combat simulator.

Fire control combat simulators are used to simulate actual fire control combat systems, such as are in modern battle tanks. A fire control system in a battle tank is under the command of the tank gunner and includes an optical system which affords the gunner a limited field of view of the overall combat scene. Disposed in the optical path is a reticle which the gunner must place on a target by manipulation of the gunner's controls. The usual turret-mounted tank gun is under the gunner's control and may be displaced in azimuth and in elevation according to the gunner's elevational and azimuthal commands. In response to these commands, tank gun displacement and corresponding changes in the field of view occur simultaneously. When the reticle has been placed on the target and the range of the target determined, the gun is so aimed by the tank's own system that a hit should occur on the target when the gunner gives the fire command.

In order to train tank gunners and to enable them to maintain and improve their skills it is desirable to use a simulator rather than to conduct live training and practice operations in the field. Currently available simulators have a number of disadvantages. Some are very complicated, and hence expensive. Others are very crude and thus lack important capabilities and realism which are beneficial for training and practice purposes. These simulators may also lack versatility.

The present invention represents a significant advance in a fire control combat simulator in a number of respects. First, a more realistic display of the field of view is presented. Essentially unlimited versatility in composing the scene which is to be displayed in the field of view is attained. Moving targets, with the capability of evasive maneuvers, can also be displayed. Motion of the firing tank can be reflected in the field of view.

Briefly, the preferred disclosed system of the invention employs a plurality of object generators each of which stores the shape of an object which may appear in the overall battle scene. A host computer assigns positions and ranges to these objects relative to the firing tank. The system will display to the gunner those objects which are within the field of view of the gunner's optical system. As the gunner imparts elevational and azimuthal commands by his controls, this information is acted upon by the host computer and transmitted to the object generators on an updated basis. The picture within the field of view is in turn correspondingly updated to reflect the gunner's commands. Another feature includes the storage of object information in each object generator. Rather than storing a dot matrix which would require an enormous amount of storage, the data compression scheme employed in the present invention stores information concerning the outline of the object and its color. There is also a priority feature linking the object generators whereby when more than one object generator is calling for its object to be displayed in the same location on the display only the object which has a higher priority and hence is at a closer range, is displayed during the overlap period.

The foregoing, along with additional features, advantages and benefits of the invention, will be seen in the ensuing description and claims which should be considered in conjunction with the accompanying drawings and disclose a preferred embodiment according to the best mode presently contemplated in carrying out the invention.

BRIEF DESCRIPTION OF THE DRAWINGS

FIG. 3 is an illustrative diagram useful in explaining operation of the system of FIG. 1.

FIG. 6 is a diagram useful in explaining the operation of the system of FIG. 1.

FIG. 7 is a diagram useful in explaining the manner of data storage in a portion of the system of FIG. 1.

DESCRIPTION OF THE PREFERRED EMBODIMENT

Because the invention is disclosed in the preferred embodiment of a fire control combat simulator for a tank, a brief introductory background explanation of such a fire control combat simulator is appropriate. Such simulators are generally used as training devices which permit a gunner to obtain practice without the necessity of going out into the field on actual combat fire control equipment. The use of such a simulator can mean a significant savings because fuel and ammunition are conserved and wear and tear on equipment is minimized. Moreover, a simulator can be constructed to afford a commander the capability of more readily observing the performance of his gunner than can be often done in the field. Modern tanks include an optical system for the gunner which provides him with a field of view through which a target can be observed. A typical field of view has a limited elevational and azimuthal extent and by way of example, may comprise a circular field of view subtending 6° in both elevation and azimuth. A reticle is placed in the optical path and once a target has been acquired within the field of view, the gunner's objective is to manipulate his controls so as to place the reticle on the target, range the target, and then fire the tank gun. The tank gun is also slaved to the gunner's controls so that it is correspondingly aimed to hit the target when the target has been ranged and the reticle placed on the target. A fire control combat simulator simulates the actual tank system. With this background, attention can now be directed to the drawings.

Figure 1:
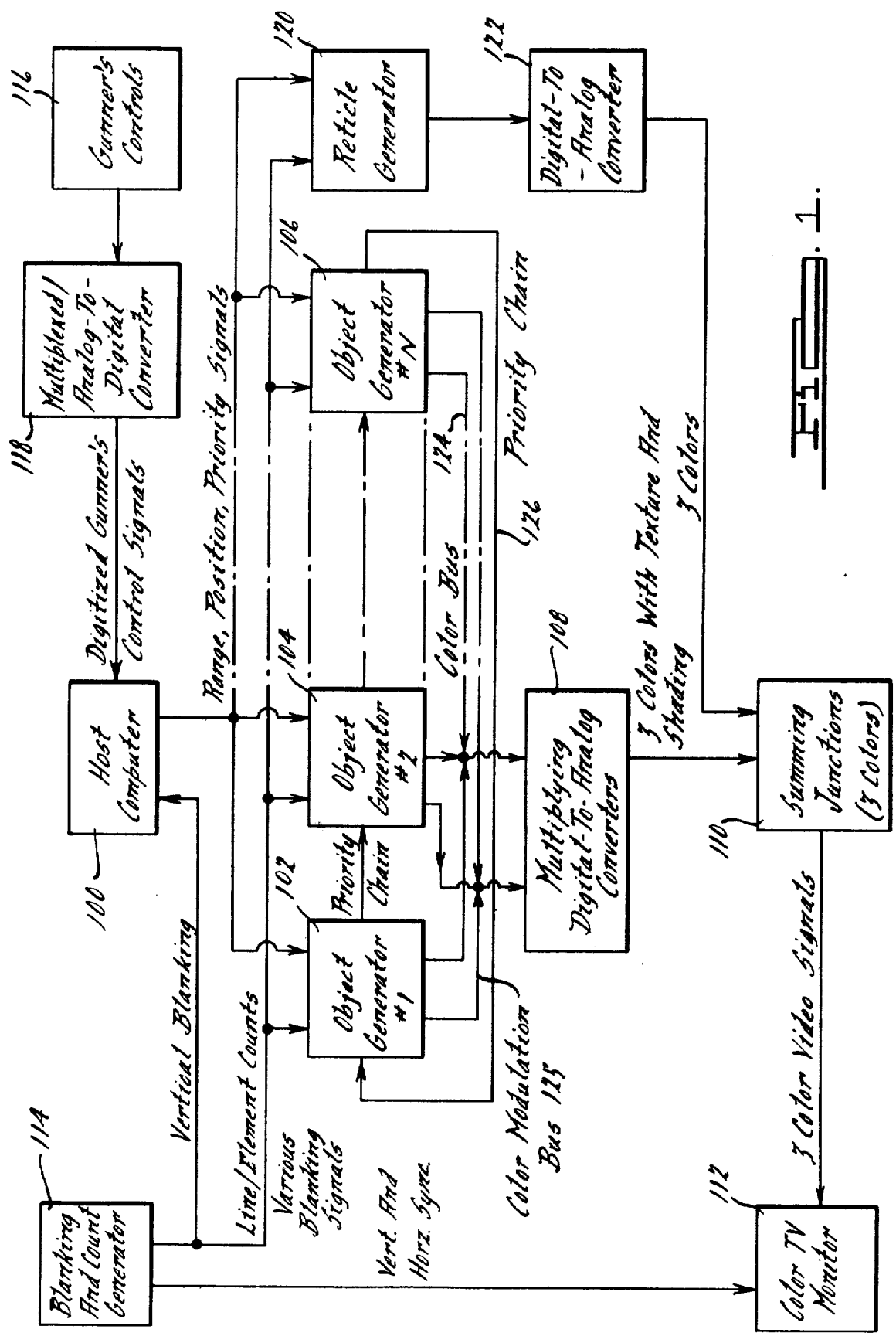
FIG. 1 is a general block diagram of a system embodying principles of the present invention.

FIG. 1 illustrates a generalized block diagram of a system embodying principles of the present invention. The system comprises a host computer 100, a plurality of object generators, three of which are shown in the drawing and identified by the reference numerals 102, 104 and 106, multiplying digital-to-analog converters designated generally by the reference numeral 108, summing junctions designated generally by the reference numeral 110, a color video display 112 (such as a conventional color TV monitor) and a blanking and count generator 114. The invention may be practiced in the disclosed embodiment of a fire control combat simulator, and for this purpose there are provided in the system shown in FIG. 1, gunner's controls designated generally by the reference numeral 116, an analog-to-digital converter 118, a reticle generator 120 and a digital-to-analog converter 122.

Various communication channels interconnect the blocks of FIG. 1. Certain outputs of the object generators 102, 104, 106 are on a common digital color bus 124 which has the usual three channels for the usual three colors, red, blue, and green. Other outputs of the object generators are on a color modulation bus 125. Block 108 comprises three individual multiplying digital-to-analog converters, one for each of the three colors; each of the three digital color signals is converted thereby into a corresponding analog color video signal. The intensity of the analog color video signal is modulated by the color modulation information on bus 125 to provide unique shading and texturing, as will be described in detail later on. The block 110 comprises three analog summing junctions, one for each color. The red, blue and green analog color video signals from the converters of block 108 are summed with corresponding analog signals developed jointly by reticle generator 120 and digital-to-analog converter 122 to develop the three color video signal inputs to TV monitor 112.

Each object generator contains electronically stored information representing the image of a selected object such as a tree, hill, house, pond, etc. The stored information includes the outline of the object, color of the object, and, the object's shading and texture. Each object generator also stores a unique identification number representing that object generator. The reticle generator stores the image of a reticle defining the line of sight which the gunner places on a selected target. In the subsequent description the phrase "object generator" will include the reticle generator unless the context indicates otherwise.

The host computer 100 functions to compose a scene for TV monitor 112 consisting of one or more of the objects stored in the object generators. The host computer supplies range, position, and priority information to each of the object generators. The purpose of the position and range information is to enable the object generators to position the objects at selected locations within a scene with appropriate scaling for range. The object generators act upon the position and range data received from the host computer so that video signals for TV monitor 112 are developed to portray the objects in the scene at the assigned ranges and positions. In the process of developing the video signals each object generator may perform a scaling function to scale its object in size according to the range information which it receives from the host computer. The purpose of the priority information is to give each object a priority with respect to the other objects such that an object which is at a lesser range has a higher priority than an object at a greater range. (While the reader may observe that the priority information is thus to a certain extent redundant with respect to the range information, the use of a separate priority number assigned to each object generator in the disclosed system results in less overall complication for priority determination.) Where the scene set by the host computer positions the objects with all or a portion of one object overlapping all or a portion of one or more other objects, then a priority chain 126 linking the object generators acts upon the priority information so that in each area of overlap the object which has been assigned the highest priority has its overlapping portion displayed instead of those with lower priority. In this way an object at a lesser range (i.e., higher priority) will occult objects at greater ranges (i.e., lower priorities) in areas wherein overlaps occur. Thus, discolorations which might otherwise occur by combining the video color signals of the overlapping portions, are thereby avoided. It should be noted that the reticle generator is not coupled in the priority chain so that it will always appear on the field of view. The color of the reticle is composed to be translucent so that it overlays, rather than obscures the background scene.

Blanking and count generator 114 supplies several control signals. Vertical and horizontal synchronizing (sync) signals are supplied to the TV monitor 112. The vertical sync signal serves to sync the vertical sweep of the TV monitor, and the horizontal sync signal the horizontal sweep. The vertical and horizontal blanking signals serve to blank the video signals during vertical and horizontal retraces, or flybacks, and also to permit updating of information between the host computer and the object and reticle generators. A line count signal and an element count signal are supplied to the object and reticle generators for use in developing the video signals in a manner which will be explained in greater detail later on in the description.

The gunner's controls 116 comprise transducers which generate analog rate signals in response to elevational and azimuthal commands by the gunner. The elevational and azimuthal rate signals are converted by circuits of converter 118 into digital signals which are supplied to host computer 100. Host computer 100 acts upon these digital signals to establish the field of view which is displayed on monitor 112 and which is that portion of the overall scene composed by the host computer which is seen by the gunner. Hence, the picture on the TV monitor simulates what the gunner would see in his own optical system of his own tank. When the gunner commands elevational or azimuthal displacement by means of controls 116, there occurs a correlated change in the field of view which is accomplished in the disclosed system by host computer 100 supplying updated information to the object generators. In this way realistic simulation is achieved by making it appear to the gunner that the field of view traverses the overall scene in accordance with his commands; whereas what in fact is actually occurring is that the scene appearing on the TV monitor 112 is being changed electronically by the system of the present invention in accordance with his commands.

Figure 2:
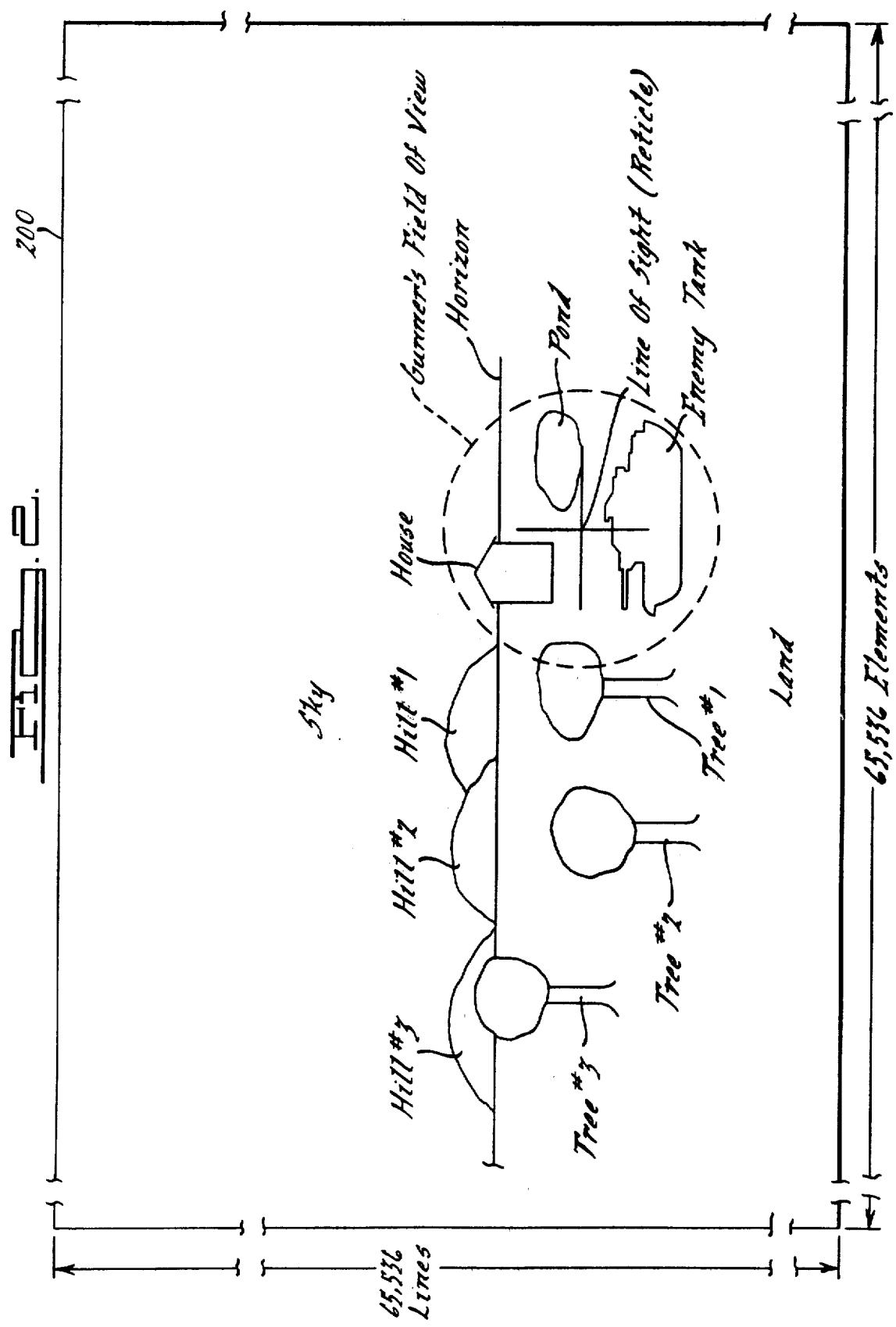
FIG. 2 is an example of a scene which may be generated with the system of FIG. 1.

FIG. 2 illustrates an example of a scene which may be generated with the system of FIG. 1. The overall scene may be considered as occupying the area bounded by an imaginary rectangle 200. Thus, the scene is two dimensional in nature and would typically have elevational and azimuthal extents corresponding to the elevational and azimuthal ranges of travel of the turret-mounted tank gun. In an actual tank the gunner will see only that portion of the overall scene which appears in his optical system, and therefore in the simulator embodying the present invention the gunner's field of view is indicated by the imaginary broken line so designated in FIG. 2. As the gunner operates his controls, the field of view correspondingly change with objects in the scene coming into and passing from view as the scene is scanned. While a conventional TV monitor typically has a rectangular picture tube it may be appropriately masked to provide a circular field of view (as shown in FIG. 2) simulating the actual gunner's optical system in the tank.

Each of the objects in the scene is provided by a corresponding object generator such as 102, 104, 106. The object generator defines, as explained above, the basic shape and color of the object. The location at which the object is placed in the overall scene however is under the control of the host computer 100. Each object generator acts upon the position and range information received from the host computer in conjunction with its own object information in the development of the video signals for TV monitor 112 to cause the objects to appear at the desired ranges and positions. The particular manner in which these signals are developed will be explained in detail later. As will be better understood from this more detailed description, only those objects which are within the gunner's field of view at any given time are actually displayed on the monitor; as the gunner operates his controls, the signals change to bring objects into and out of the field of view so that the gunner perceives that the overall scene is being scanned as he operates the controls.

It was mentioned above that a priority is also assigned to each object, and comes into play when an overlap situation occurs. Thus, in the FIG. 2 example, tree No. 3 has a higher priority than hill No. 3 and similarly, hill No. 2 has a higher priority than hill No. 1.

While many objects in the scene will be fixed in position, their relative positions in the scene may change as the firing tank's position changes. The host computer may have the capability of receiving or generating an additional input (not shown in the drawing) which represents the firing tank's travel. The host computer in turn acts upon this additional input to generate new position signals to the object generators which causes the repositioning of the objects in the scene to simulate change in the scene due to firing tank travel. In addition, the capability for having a moving object in the field of view may also be provided. For example, an enemy tank is shown in FIG. 2 and this may be programmed for motion along a desired path by means of host computer 100 similarly updating the position and range data to the tank object generator in accordance with the desired path. These capabilities are useful in attaining more realistic simulation of actual possible battle conditions.

FIG. 3 illustrates how the picture on display 112 is developed. Standard color television video transmission in the United States will generate 30 picture frames per second with a 2:1 interlace (i.e., two fields per frame). The vertical sync signal is therefore at 60 hertz. The present invention is disclosed by way of example at 12 picture frames per second with a 5:1 interlace to provide greater resolution in the vertical (i.e., elevational) direction. The 12 frame per second rate is still sufficiently fast to provide continuity from one frame to the next. One horizontal sweep of the electron beam across the face of the picture tube is referred to as a line. For purposes of the invention, each line is considered as consisting of 1280 elements. The conventional commercial TV in the United States operates at 262.5 lines per field and thus each frame consists of 525 lines. The implementatation of the present invention changes this to 262.4 lines per field so that a greater vertical resolution is achieved because each frame now consists of 1312 lines. FIG. 3 illustrates the electron beam sweep pattern for each of five successive fields numbered 1 through 5. As can be seen, the beam returns to the same point every fifth field; hence the 5:1 interlace. The system design, which will be explained in greater detail later, establishes, for each field, the initial line and every fifth line thereafter. In this way, the five illustrated fields, when combined, represent one complete frame.

Figure 4:
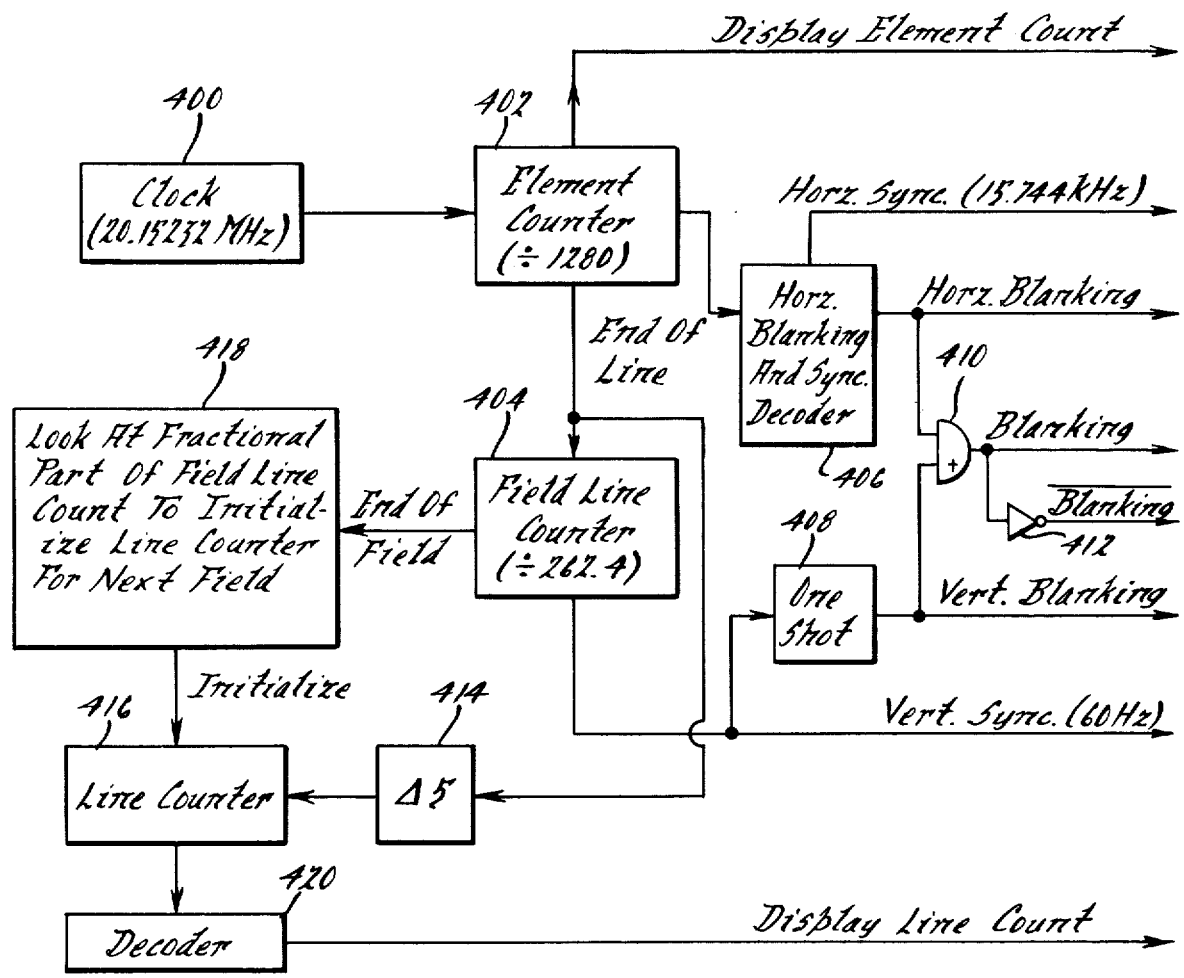
FIG. 4 is a more detailed block diagram of one of the blocks of FIG. 1.

FIG. 4 illustrates greater detail of blanking and count generator 114. This circuit is utilized in developing the sweep patterns shown in FIG. 3. It generates suitable horizontal and vertical sync signals to provide the 262.4 lines per field, namely, a 60 hertz vertical sync signal and a 15.744 kilohertz horizontal sync signal. The circuit comprises a clock 400 producing a 20.15232 megahertz signal which is supplied to an element counter 402. Element counter 402 is a conventional dividing counter which operates to divide the clock signal by the decimal number 1280. The divisor corresponds to the number of elements in each line of the sweep as defined above. A horizontal blanking and sync decoder 406 monitors the count in counter 402 and generates the horizontal blanking and sync signals in the following manner. The horizontal blanking signal is produced between counts 1024 and 1279 with the horizontal sync signal being produced after the first 128 elements of the horizontal blanking signal. The timing is such in relation to the count in counter 402 that the resetting of the counter at the end of 1280 counts coincides with the termination of the horizontal blanking period. Thus, maximum length of a line which can appear on the video display will begin at element count 0 and end at element count 1023. The horizontal sync signal is supplied as indicated in FIG. 1 to certain circuits while the end of line signal is supplied to another counter 404 which is referred to as the field line counter. The field line counter is set to divide the end of line signal by the decimal number 262.4. Thus, every 262.4 occurrences of the end of line signal a vertical sync signal is generated. With this explanation, the relationship between the frequencies of the vertical sync, the horizontal sync and the clock signals should be apparent to the reader. The horizontal and vertical sync signals are supplied to the television monitor to initiate a flyback, or retrace, of the respective horizontal and vertical sweep signals. A one-shot 408 receives the vertical sync signal to generate a corresponding vertical blanking pulse, of about one millisecond duration. This allows the vertical deflection circuit to reset itself to the top of the screen and as a result several horizontal sweeps are not visible. An OR gate 410 performs an OR function on the horizontal and vertical blanking pulses to provide a blanking pulse which is indicative of either horizontal or vertical blanking. An inverter 412 inverts the blanking signal to provide the complement thereof. The horizontal and vertical blanking signals and the blanking and blanking signals are supplied to other circuits as shown in FIG. 1.

Because it keeps a running count of the clock pulses, counter 402 thereby provides a display element count (or element count) in the form of a binary word which represents at any instant of time the horizontal position of the electron beam during non-blanking. A counter 416 provides what is referred to as the display line count, (or line count) which represents that line out of the 1312 lines of a frame which is being swept by the beam at any instant of time. The line count, is provided by a decoder 420 associated with counter 416. Because each field sweeps every fifth line, it becomes necessary for the count to be incremented in increments of five. This is accomplished by monitoring the end of line signal from element counter 402 and by means of a circuit 414, incrementing line counter 416 by the decimal number 5 at the end of ever horizontal sweep. This can be accomplished by gating a suitable frequency clock signal to counter 416 every time an end of line signal is given so that five clock pulses are fed to the counter at the end of each line. As pointed out above, it is also necessary to initialize the line at which the sweep of each field begins. Thus, for field No. 1, it is necessary to initialize the count in counter 416 so that line 4 is initially swept. A suitable circuit 418 is connected to field line counter 404 and when it receives the end of field signal, it looks at the decimal portion of the number in field line counter 404. Let it be assumed that the decimal is initially zero. If a zero decimal is detected, the count in line counter 414 is so initialized that a suitable number is preset into counter 414 that the first line of the ensuing field to be swept is line No. 4. Field No. 1 is thus developed as indicated, and when the next end of field signal is generated the decimal in circuit 404 will be four. Now a suitable number is preset into counter 416 so that field No. 2 will begin at line No. 2. When this field terminates the decimal will be eight and hence the preset is such that line zero will be the first line of field No. 3. Field No. 3 terminates with the decimal equal to two and this will cause line No. 3 to be first one of field No. 4. When field No. 4 terminates the decimal will be six and this will cause line No. 1 to be the first one of field No. 5. At the conclusion of field No. 5 a zero returns and hence the next field No. 1 is initiated with line No. 4 being first. Thus, in this way it can be seen that 12 frames per second are developed with a 5:1 interlace. It should be pointed out that the disclosed example is merely for illustrative purposes and that there are other possibilities for developing the video sweep patterns.

Figure 5:
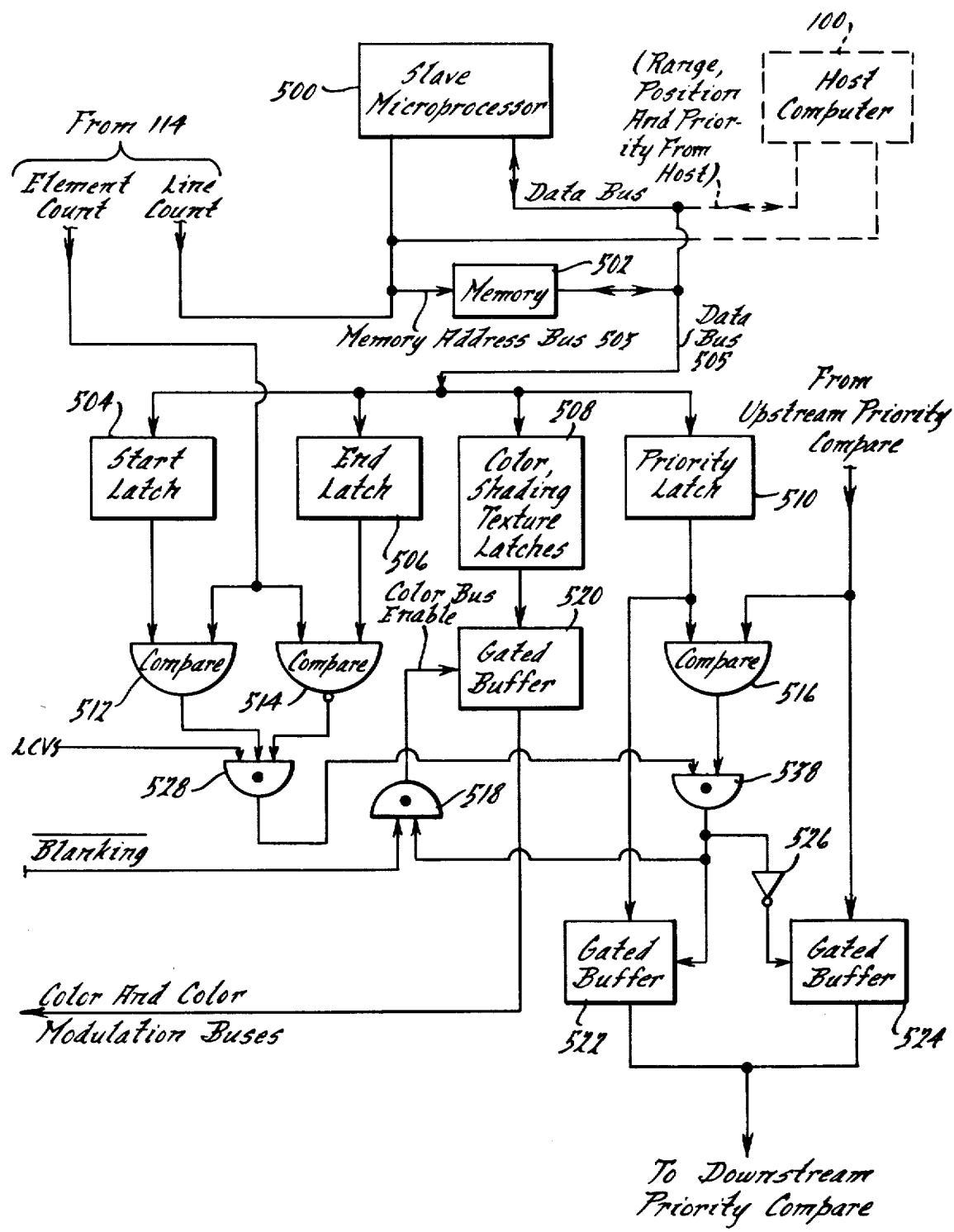
FIG. 5 is a more detailed block diagram of a portion of the system of FIG. 1.

Greater detail of an object generator is shown in FIG. 5. The object generator comprises a microprocessor 500, such as a Texas Instruments model TM990. The object generator also contains a memory 502 and a plurality of latches identified generally by the numerals 504, 506, 508 and 510 respectively. There are also three comparators 512, 514, 516, three logic gates 518, 528, 538, three gated buffers 520, 522, 524 and an inverter 526. A memory address bus 503 is provided as shown so that memory 502 can be accessed by host computer 100 and microprocessor 500. A data bus 505 is provided as shown so that data can be transmitted between memory 502, microprocessor 500, and host computer 100, as well as to latches 504, 506, 508 and 510.

The microprocessor 500 is in communication with host computer 100 to receive range, position and priority data from the host. There is the additional capability provided (but not shown in this Figure) whereby the microprocessor 500 may communicate back to the host. Memory 502 electronically stores the data relating to the object which is generated by the object generator.

By way of example, memory 502 may be a random access memory (RAM) which may be accessed by the microprocessor 500. Briefly, the purpose of this portion of the object generator is to load data into the latch circuits 504, 506, 508, 510 which relate to the generation of the object on the TV monitor.

At this juncture it is appropriate to consider the basic concept by which an object is generated on the TV monitor. While the concept will be introduced with reference to FIG. 6 for a specific example, the present invention affords the capability of more sophisticated manipulations involving scaling and positioning of the objects. How the sophistications are accomplished will be explained in greater detail later. Looking then to FIG. 6 the reader will observe the outline of an object 600, which for the example illustrated, is a side elevational view of an enemy tank. The outline is referenced to a two-dimensional rectangular coordinate system which may be considered as having a horizontal x axis and a vertical y axis. For purposes of the example, the x and y axes each have 256 graduations, equally spaced. Rather than considering the object to consist of a multitude of dots filling the entirety of the object (i.e., a dot matrix) each of whose x, y coordinate locations are stored in memory, the present invention employs a unique technique for compressing the otherwise voluminous dot matrix data into a greatly reduced amount of storage. This is done by considering the object to comprise a multitude of horizontal line segments which are vertically incrementally spaced along the y axis. In the example, the maximum length of a line can be 255 increments, and the maximum number of lines can be 256. Each of the horizontal line segments defining the object will being where it first intersects the outline of the object (proceeding from left to right as viewed in FIG. 6) and will end where it intersects the outline of the object the second time. FIG. 6 illustrates one of such line segments which is referred to as the active segment of line N. For a given line N the abscissa of the object line segment starting point and the abscissa of the ending point define respective starting and ending elements. Also associated with each line N is color information (including shading and texturing) which will define the object color of the line. Thus, the image of the object may be defined in its entirety by identifying for each line, the starting element and the ending element, and the color information. It is this information which is stored in memory 502.

FIG. 7 illustrates the manner of data storage for the object in memory 502. The storage may be considered as comprising three matrices 700, 702 and 704, each consisting of 256 16-bit words and a separate matrix 706 consisting of two 16-bit words. Corresponding words of each matrix 700, 702, 704 relate to a corresponding line. The start element matrix 700 contains the start element for each of the 256 lines and the end element matrix contains the end element for each of the 256 lines. The color matrix 704 contains the red, green and blue color information and information regarding shading and fine texture for each line. Thus, for a given line N, where N can be any integer 0 to 255, the number stored in the start element matrix at an address corresponding to N designates the start element of the line; and the number stored at the corresponding address of the end element matrix designates the end element of the line. For the purposes of explanation, the bits of each word of each matrix may be considered to have increasing significance from right to left as viewed in FIG. 7. The color information for each line is stored according to the storage scheme shown in matrix 704 wherein the red color information is contained in bits 12 through 15; the green color information in bits 8 through 11, and the blue color information in bits 4 through 7. Hence, the color information contained in bits 4 through 15 of each word of color matrix 704 provides digital data for the color bus. Bits 1 through 3 contain what is referred to as "fine texture" information, and the zero bit contains information for selecting one or the other of the two words in matrix 706. Bits 8 through 15 of matrix 706 contain what is referred to as "shading" information while bits 0 through 7 contain what is referred to as "coarse texture" information. The shading information is further broken down into bits 12 through 15 which contain what is referred to as "amplitude" information and bits 8 through 11 which contain what is referred to as "slope" information. The significance of these designations will be seen later on in the description of how the shading information is imparted to the picture line. The coarse texture information is likewise broken down into what is called "amplitude" information contained in bits 4 through 7 and what is referred to as "frequency" information contained in bits 0 through 3. The coarse texture information, in conjunction with the fine texture information from color matrix 704, is utilized in imparting texture to the line of the display in a manner which will be explained in greater detail hereinafter. The fine texture information in bits 1 through 3 of the words of matrix 704 in conjunction with the shading and texture information of the selected word of matrix 706 by the 0 bit of the word of matrix 704 provide data for the color modulation bus. The data compression scheme of the invention greatly reduces the amount of storage which is required over that which would be needed if a dot matrix technique were used for storage. Moreover, the inclusion of shading and texture contributes to realistic simulation of objects.

Attention can now be redirected to FIG. 5. Let it be assumed that it is desired to display an object such as the enemy tank shown in FIG. 6 on the TV monitor 112. Also, for the moment let the effects of the position and range data supplied to the object generator by the host computer be disregarded. The three latches 504, 506, and 508 are loaded with data for a selected initial line from the object storage matrices of FIG. 7. The line number is selected by the blanking and count generator 114 per the sweep technique illustrated and described with reference to FIG. 3. Thus, at the beginning of the object generation, the start and end element words of the initial object line are called up from storage in memory 502 and loaded into latches 504 and 506, respectively. The color information is also called up and loaded into latches 508. As the horizontal sweep for that initial line proceeds, the element count from the blanking and count generator 114 provided to both comparators 512 and 514 is continually compared against the start element and the end element respectively. Comparator 512 performs a logic function to produce a logic one output only when the element count equals or exceeds the start element in latch 504. Comparator 514 produces a logic one output only when the stop element in latch 504 equals or exceeds the element count. Thus, the outputs from both comparators 512 and 514 are both logic ones only when the element count from blanking and count generator 114 is at or between the start and end elements which have been loaded into latches 504 and 506, respectively. It is this condition which is detected by gate 528 whereby gate 528 produces a logic one output only when both outputs of comparators 512 and 514 are logic ones and signal LCV (to be described) is also logic one.

The output from gate 528 is supplied as an input to logic gate 518. There is an additional inputs to logic gate 518 and let it be assumed at the moment that it is logic one. For gate 518 to produce a logic one output both inputs to it must be logic ones. Thus, when the element count is between the start and stop elements for that line, gate 518 supplies a logic one color bus enable (CBE) signal to gated buffer 520 whereby the color information for that line which has been loaded into latches 508 is transmitted onto the color and color modulation buses. As will be appreciated the color bus supplies a digital color signal representing the color of the line, and the color modulation bus supplies a digital signal defining shading and texture. Referring back to FIG. 1 the reader will therefore appreciate that what will be produced on the TV monitor is a color line having the color information in latches 508 which extends between points corresponding to the starting and end elements. Thus, the line of the object which is electronically stored in digital form in the object generator will be generated on the TV monitor's picture tube.

According to the sweep generation scheme described in FIG. 3, every fifth line is swept during one field. Thus, the horizontal blanking signal will cause the object generator to next update the contents of the start, stop and color latches with information for the fifth line after the one just scanned. Accordingly, as the next sweep occurs, the element count progressively increases until it reaches the updated start element which has been loaded into start latch 504. Thereafter as the sweep continues, information from color latches 508 is gated onto the color and color modulation buses until the element count reaches the end element stored in end latch 504. In this way, every fifth line of the object is generated during one field. Because the microprocessor is operating in accordance with the sweep generation scheme of FIG. 3 five fields will serve to produce one frame and hence complete the object.

Attention is directed to the priority comparison feature. As mentioned earlier, the object generators are linked by a priority chain whereby the object having the highest priority will have its color information appear on the color and color modulation buses when, for a particular line and element, more than one object generator has its signals from its two comparators 512 and 514 calling for activation of its gate 518 and hence transmission of its color information to the color and color modulation buses. It will be noted that the other input to the gate 518 of each object generator is taken from the priority comparison circuit of the object generator which comprises comparator 516, gate 538, inverter 526, and gated buffers 522 and 524. The priority comparison circuits of each object generator are linked in a chain with each object generator having its priority compare input connected to the output of the immediately upstream priority compare and its priority compare output to the priority compare input of the immediately downstream priority comparison circuit. The priority comparison circuit for an object generator is activated, or enabled, only when the object generator is calling for its color information to appear on the color and color modulation buses. When this happens the outputs of the two comparators 512 and 514 are both logic ones and hence the output from the AND logic gate 528 is also a logic one under this condition. The output of gate 528 in turn serves to gate the gate 538 which is a part of the priority comparison circuit. Comparator 516 compares the priority from the upstream object generator against the priority in latch 510. When gate 538 is gated by the logic one from gate 528, the priority comparison circuit is enabled, and the result of the comparison is transmitted to the output of gate 538 which in turn causes the higher priority to be transmitted onto the downstream priority compare. Every object generator which, for that specific line and element, is also calling for its own color information to appear on the color and color modulation buses will attempt to place its priority on the priority chain. By coupling the priority circuits in the chain, only that object which has the highest priority in its latch 510 will have its color information appear on the color and color modulation buses.

Let it be assumed that the illustrated object generator has the highest priority. Under this condition the comparator 516 will produce a logic one output which is transmitted through gate 538 and back to one input of gate 518. Let it also be assumed that the other input Blanking is a logic one. With gate 518 thus enabled, the color information in latches 508 is gated via buffer 520 onto the color and color modulation buses. The logic one from gate 538 is inverted by inverter 526 to prevent the upstream priority information from being passed downstream to the next object generator. Instead, the logic one from gate 538 causes the priority from latch 510 to be transmitted via the gated buffer 522 to the downstream object generator. Thus, only the illustrated object generator, which has the highest priority, will have its color information appear on the color and color modulation buses. This feature is advantageous in composing the scene on the video display because where overlap occurs between objects, it allows the object which as the highest priority to appear in the foreground, overlapping those objects having lower priority. Naturally, where there are no objects which have portions thereof overlapping the priority feature does not come into play, and each object is displayed in its entirety.

Figure 8:
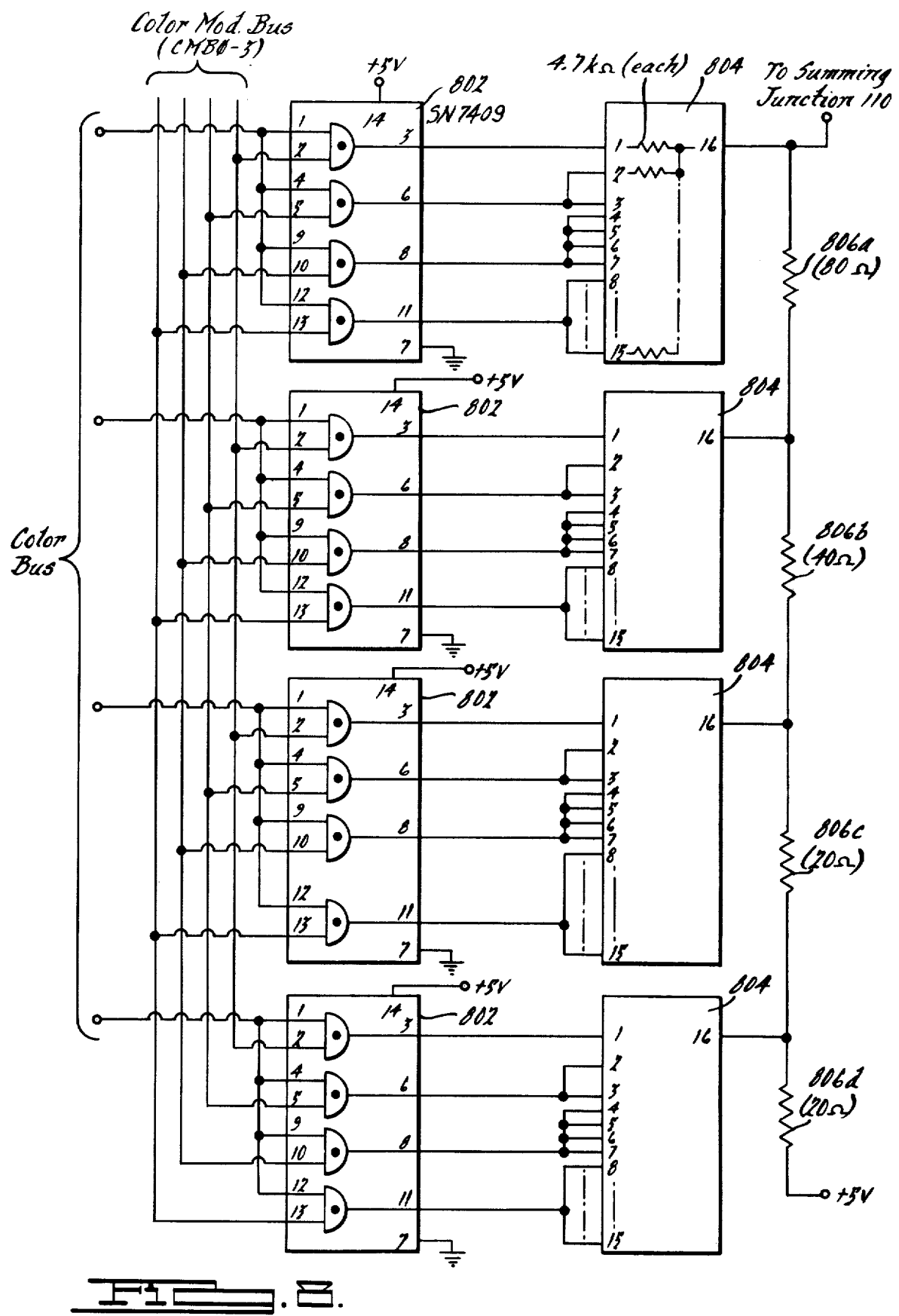
FIG. 8 is a more detailed diagram of a portion of one of the blocks of FIG. 1.

FIG. 8 illustrates a possible implementation of one of the multiplying digital-to-analog converters utilized in block 108 of FIG. 1. The FIG. 8 converter 800 is utilized for one color only, and thus the block designation 108 would actually contain three of the circuits 800, one for each color. Because four bits are utilized for each color, as explained above, in the object storage allocation scheme of FIG. 7, converter 800 has four input terminals appropriately connected to the color bus to receive the corresponding four bit word for that color. Associated with each input terminal is a circuit device 802, each device 802 containing four, two-input gates. The color modulation is defined by a four bit word and each of the four individual gates in each of the circuit devices 802 is connected to receive a corresponding bit of the color modulation word, per the connection scheme of FIG. 8. Thus, depending upon the binary values of the color modulation input and of the color input, the gates of the individual devices 802 will be selectively activated to produce four four-bit words. Associated with each circuit device 802 is a resistor pack device 804. Each device 804 comprises a set of resistors, each of which has an individual input but all of which are tied together at a common output. The inputs of the resistors are connected to the gates of the corresponding circuit device 802 in the particular fashion as shown in the drawing whereby the binary word output of each device 802 determines the number of resistors of the associated device 804 which are effectively connected in circuit, thus accomplishing a digital-to-analog conversion. Thus, the bottom gate of each device 802 is connected to the inputs of eight of the resistors of the corresponding device 804; the next gate of device 802 to only four resistors of device 804; the next to only two; and the upper one to only one. The output of the converter is connected to a corresponding summing junction in the block designated by the number 110, there being one summing junction for each of the three colors. Each of the resistor packs 804 has a particular binary significance, and conversion to analog is accomplished by connecting the output of each device 804 to a certain point in an output voltage string consisting of four resistors 806a, 806b, 806c, 806d which connect from the reference supply (+5v) to the summing junction. These four resistors have the illustrated relative component values, indicative of the significance of each resistor pack. To summarize converter 800, then, it may be said that the last-mentioned resistor string provides a "coarse" resolution with the number of individual resistors in each device 804 which are selected by the gates of the associated device 802 providing a "fine" resolution, with the combined result of providing the summing junction an analog signal which represents the product of the two digital signals on the color modulation bus and the corresponding color bus. It should be noted that the color modulation bus is connected to each of the three converters 800.

Figure 9:
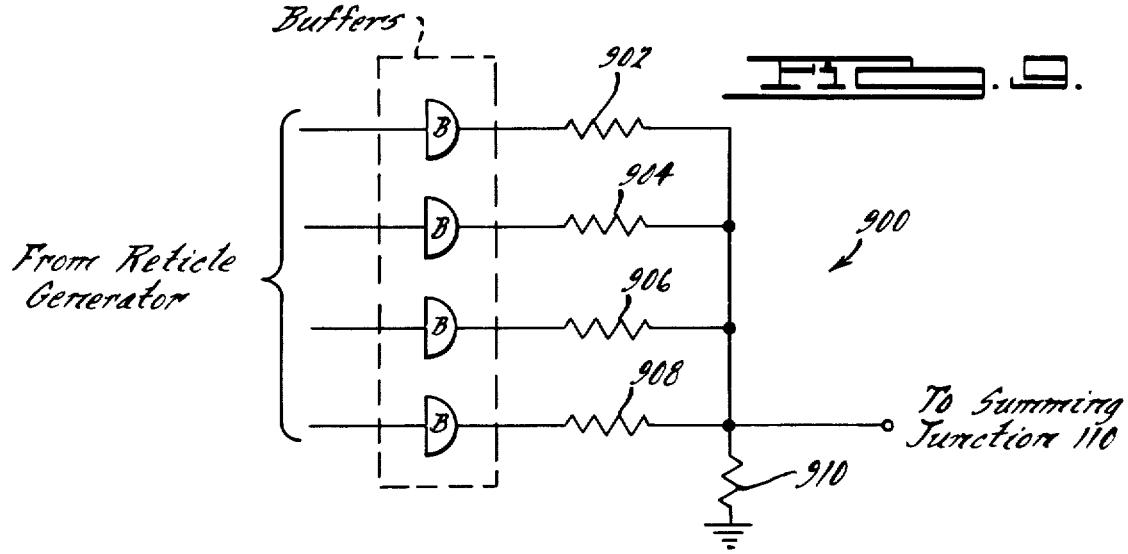
FIG. 9 is a more detailed diagram of a portion of another of the blocks of FIG. 1.

FIG. 9 illustrates further details of the digital to analog converter associated with the reticle generator. The reticle generator produces three digital color signals calculated to create the image of the reticle on the TV monitor. Thus, there is a converter required for each color. Each converter, such as shown in FIG. 9, comprises an input which receives the corresponding four bit color word. It has a single output which connects to the summing junction to which the corresponding converter of block 108 connects. The circuit 900 comprises five resistors 902, 904, 906, 908, and 910. The resistor values 902, 904, 906, 908 are in inverse proportion to the significance of the corresponding bit received from the reticle generator. Thus, the contribution to the sum current from circuit 900 is an analog signal which is representative of the binary word input to the converter.

Figure 10:
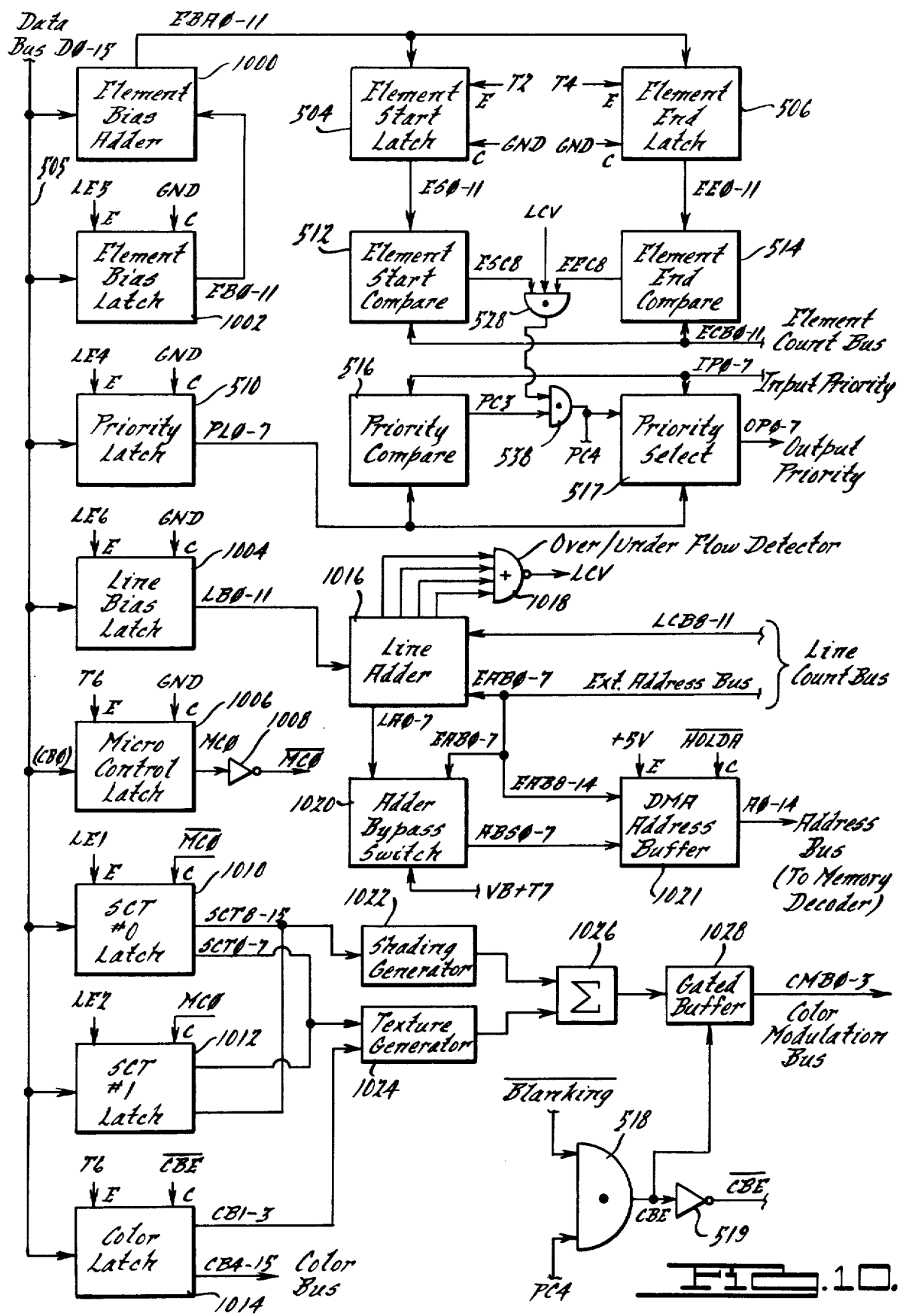
FIG. 10 is a still more detailed diagram of a portion of FIG. 5.
Figure 12:
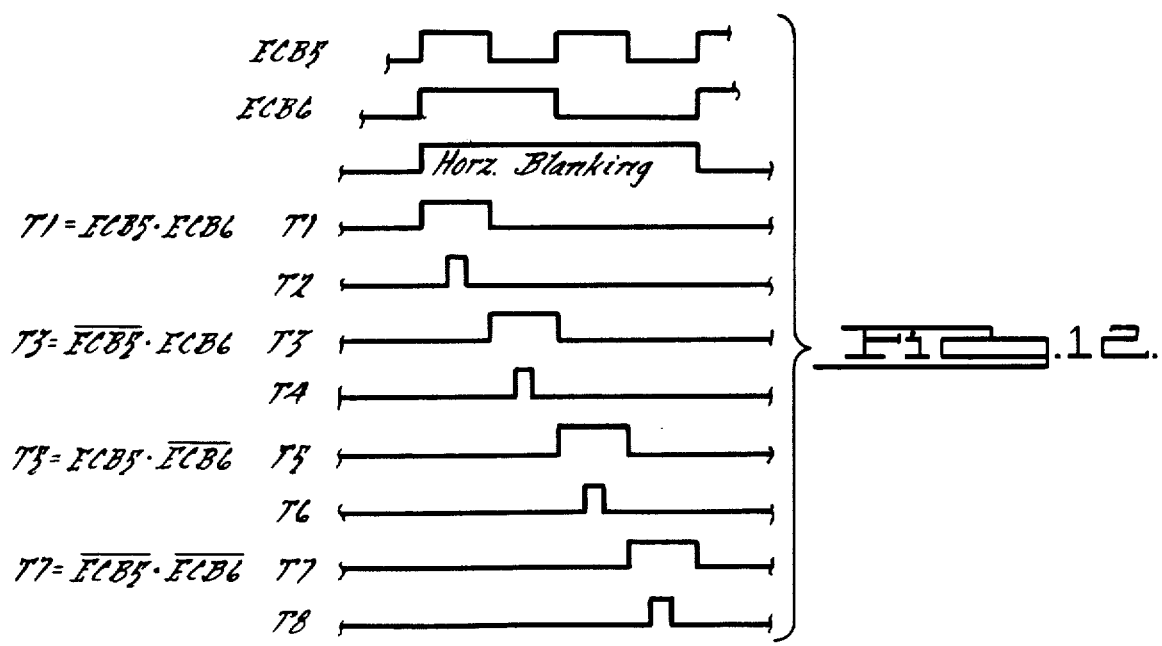
FIG. 12 is a diagram illustrating timing signals useful in explaining operation of the system shown in FIGS. 10 and 11.

FIG. 10 illustrates greater detail of the system. Element start latch 504 and element end latch 506 are shown to receive data via a 12-bit bus EBA$\phi$-11. Data on this bus is entered into latch 504 by the signal T2 and data into latch 506 by the signal T4. The occurrence of these timing signals is shown in FIG. 12 and will be explained in greater detail later. By grounding the terminal C of each latch, the start element immediately appears on the output bus ES$\phi$-11 as soon as it is entered into its latch, and the end element immediately appears on the output bus EE$\phi$-11 as soon as it is entered into its latch. The element count is supplied by the element count bus ECB$\phi$-11 to both comparators 512 and 514. Comparator 512 compares the element count against the start element on bus ES$\phi$-11 provides an output signal on line ESC8 when the element count equals or exceeds the start element. Similarly, the element end comparator 514 provides an output signal on line EEC8 when the end element in latch 504 equals or exceeds the element count. Gate 528 monitors the two signals on lines ESC8 and EEC8, and the output of gate 528 connects to gate 538 and to gate 518.

The priority data takes the form of eight-bit words with the upstream priority word being supplied to the priority compare 516 and also to a priority select 517, on a bus IP$\phi$-7. Priority latch 510 supplies its priority word to 516 and 517 via the bus PL$\phi$-7. Priority select circuit 517 implements the functions of the gated buffers 522, 524 and the inverter 526 of FIG. 5 and provides the downstream priority information on the output priority bus OP$\phi$-7. The signal on line PC3 represents the result of the priority comparison and is gated by gate 538 to priority select 517 via the line PC4. PC4 also gates one input of gate 518.

The data bus 505 is designated as D$\phi$-15 in FIG. 10 and the eight blocks along the left hand margin of the drawing are on the data bus. These eight are: priority latch 510, element bias adder 1000, element bias latch 1002, line bias latch 1004, micro control latch 1006, SCT#0 latch 1010, SCT#1 latch 1012, and color latch 1014. With the exception of element bias adder 1000, data is entered into the other seven at selected times per the timing scheme which will be explained later on with reference to FIG. 12.

The line count is supplied to a line adder 1016. The line count, which is in the form of a twelve-bit word is supplied via what are shown in the drawing as two individual buses LCB8-11 and EAB$\phi$-7. The designation of two separate buses is because bus EAB$\phi$-7 is used for the further purpose of an external address bus, as will be explained in more detail later on. Line bias latch 1004 is associated with line adder 1016 and supplies a line bias word via the bus LB$\phi$-11. The line bias and the line adder are used to vertically position the object on the video display in a manner which will be explained in greater detail hereinafter. An over/under flow detector 1018 monitors for over and under flows of the line count adder for the purpose of determining a valid line count. Hence, the output signal of detector 1018 is designated LCV, meaning line count valid, and it is this signal which is supplied to one of the inputs of gate 528. Only when a valid line count exists is the signal LCV at a logic one. Hence, the color bus enable signal CBE is given by gate 518 only for valid line counts so as to prevent the object generator from giving color signals in response to invalid line counts. Two additional devices, namely an adder by-pass switch 1020 and a direct memory access (DMA) address buffer 1021 are associated with line adder 1016 for a purpose hereinafter explained. The element bias adder and latch are employed to horizontally position the object on the video display in a fashion to be described later.

Latches 1006, 1010, 1012 and 1014 may be considered together since they are utilized to latch the color, shading and texture information from memory 502 per the format of FIG. 7. For each line, the red, green, blue and fine texture frequency information is entered in color latch 1014. The red, green and blue color digital signals appear on the color bus CB4-15. The fine texture frequency appears on the bus CB1-3. The least significant bit of the color word (i.e., the CB$\phi$ bit) is utilized as explained above, to select one of the two shading and coarse texture words. This bit is entered in micro control latch 1006. The output line MC$\phi$ of micro control latch 1006 indicates the value of this bit. An inverter 1008 is associated with micro control latch 1006 to provide the complement of the bit which has been entered in this latch. It is the MC$\phi$ and the $\overline{MC\phi}$ which control the two latches 1010 and 1012. The shading and coarse texture word No. 0 is entered in latch 1010 and the shading and coarse texture word No. 1 is entered in latch 1012. By connecting the MC$\phi$ signal to the C terminal of one of the two latches 1010, 1012 and the $\overline{MC\phi}$ signal to the other of the two latches, only one of the two latches will provide its data on the output bus SCT$\phi$-15 which is common to both latches 1010, 1012. In the drawing, this bus is illustrated as two separate buses SCT$\phi$-7 and SCT8-15. The former contains coarse texture information supplied to an input of a texture generator 1024. The latter supplies shading information supplied to a shading generator 1022. The fine texture information on bus CB1-3 is supplied to another input of texture generator 1024. The texture generator develops a binary word output representing the texture of the line. The shading generator develops a binary word output representative of the shading of the line. The two outputs of the generators 1022, 1024 are algebrically summed by a summer 1026 and the sum is supplied to a gated buffer 1028. Buffer 1028 is gated by the color bus enable signal so that when the CBE signal is a logic one, the binary word output representing color modulation is on color modulation bus CMB$\phi$-3.

Where shading and texture are desired to be imparted to a line of the object, the color modulation bus will supply a binary signal whose value changes across the length of the line being generated. This binary signal is utilized in the multiplying digital-to-analog converters 108, and individually it serves to modulate the intensity of the electron beam. As explained earlier with regard to FIG. 7, the shading information contains both amplitude and slope information. Briefly, the amplitude information is for the purpose of determining the relative intensity between the lightest and darkest part of a line. The slope determines the extent along the line of the shaded and unshaded portions. The shading generator may comprise a counter which is preset with the amplitude information. The shading generator may further comprise a clock and frequency divider which will vary the clock frequency as a function of the shading frequency information. The frequency-divided clock signal may be used to cause the counter to count down and in this way a suitable binary signal is output by the shading generator which represents the shading for the object line. The count down occurs during the line scan and may be considered as being in the form of a digital ramp signal.

Texture is defined by the coarse texture and fine texture information. The amplitude portion of the coarse texture information defines the amplitude of the texture signal. The frequency portion of the coarse texture signal and the fine texture frequency information in the color word together define the frequency of the texture signal. Compared to the shading frequency, texture frequency is considerably higher. Texture generator 1024 may comprise a counter which counts up and down in an amount determined by the texture amplitude information. A clock and frequency divider may also be used to control the counting frequency as a function of the texture frequency information. In this way, the texture generator will produce a binary word whose value changes across the line scan. It may be considered as being a digital triangular shaped signal across the line. When this texture signal is added to the shading signal both shading and texturing appear on the object line. By imparting shading and texture to the line, more realistic simulation of an object is accomplished.

In the description of FIG. 10 brief reference was made to the scheme for loading data into the latches. Now that FIG. 10 has been described, it is appropriate to consider in greater detail the manner in which data is entered into the latches with reference to FIGS. 11 and 12. Considering first FIG. 12, the reader will observe that there are a series of timing signals including the horizontal blanking signal and followed by the signals designated T1 through T8 inclusive. The timing signal waveforms are not necessarily to scale, but rather are for the purpose of explaining principles of operation. As can be seen, the signals T1 through T8 are generated during the horizontal blanking pulse. Conventional timing pulse circuitry (not shown) may be employed to generate the timing signals T1 through T8. Briefly, the signals T1, T3, T5 and T7 cause, via the address technique hereinafter described, information in memory 502 to appear on the lines D$\phi$-15 of data bus 505. The other pulses T2, T4, T6, and T8 are for the purpose of strobing the respective latches so that the data on the data bus is entered in the appropriate latch. The signals T1 and T2 are associated with entry of the start element of each line into latch 504. The signals T3 and T4 are associated with the entry of the end element of each line into latch 506. The signals T5 and T6 are associated with the entry of information into color latch 1014 and micro control latch 1006. The signals T7 and T8 are associated with entry of data into the other latches.

Because data bus 505 is common to the latches, the timing sequence for generating signals is important to insure that the correct data from memory 502 is entered into the correct latch. Phase of the signals T1, T3, T5 and T7 is accomplished by monitoring the element line count bits ECB5 and ECB6. During the occurrence of the horizontal blanking pulse, the bits ECB5 and ECB6 exhibit transitions exemplified by the two waveforms at the top of FIG. 12. Accordingly, these two bits provide the four different binary values, namely, "11", "10", "01", "00" so that the latches can be loaded to contain the correct data for the next scan line.

The timing circuitry for generating the T1 signal is responsive to the "11" condition of the EC5, EC6 bits and generates the T1 signal in response thereto. The circuit for generating the T2 signal may monitor the T1 signal and give the T2 pulse in delayed relation to the leading edge of the T1 pulse so that sufficient delay time is allowed for the start element data from matrix 700 to appear on the data line bus 505 before the T2 pulse strobes the data into start latch 504. It should be noted that the start latch 504 is not directly on the data bus line but rather is on the bus EBA$\phi$-11 which is from element bias adder 1000. The element bias adder is an online device which adds the data received from element bias latch 1002 via bus EB$\phi$-11 with whatever data is on the data bus lines and supplies this sum on the bus EBA$\phi$-11. Thus the data on this latter bus is representative of the element start data only during the T1 pulse. Because the T2 strobe pulse is given during the T1 pulse interval the element start data is accurately entered into the element start latch.

The T3 signal pulse is given by a circuit which is responsive to the "01" condition of the EC5, EC6 bits. The T3, T4 signals serve to cause the end element data from matrix 702 to be entered into latch 506. It will be noted that element end latch 506 is connected with element bias adder 1000 in the same manner as the element start latch 504. Thus, only during the T3 pulse is the element end data on bus EBA$\phi$-11 so that it is this information which is accurately entered into latch 506 when the latter is strobed by the T4 pulse. In this way, both start and end elements are accurately entered into latches 504 and 506 for each line to be scanned.

The T5 signal pulse is given by a circuit responsive to the "10" condition of the ECB5, ECB6 bits. It causes the appropriate information from color matrix 704 to be entered into latches 1014 and 1006 in response to the T6 strobing pulse.

The T7 pulse signal is given in response to the "00" condition of the ECB5 and ECB6 bits. The T7 signal also causes data from memory 502 to appear on data bus 505 for entry in the appropriate latch when the T8 strobing pulse signal occurs. While the element start, element end and color data for the next scan line are always entered into their respective latches between scans, the other latches are updated on a less frequent basis. For these remaining latches, data is entered into each latch only once per every eight scan lines. This is accomplished by using a three-bit counter 1100 in FIG. 11 which advances one count per every occurrence of the T6 pulse. A three line to eight line decoder 1102 monitors the count in counter 1100 and will generate one of eight pulse signals LE$\phi$ through LE7 in response to each occurrence of the T8 pulse. The particular output to which the T8 pulse is transmitted is determined by the count in counter 1100 and hence the signals LE$\phi$ through LE7 are given in sequence, with each one occurring once per every eight lines.

Figure 11:
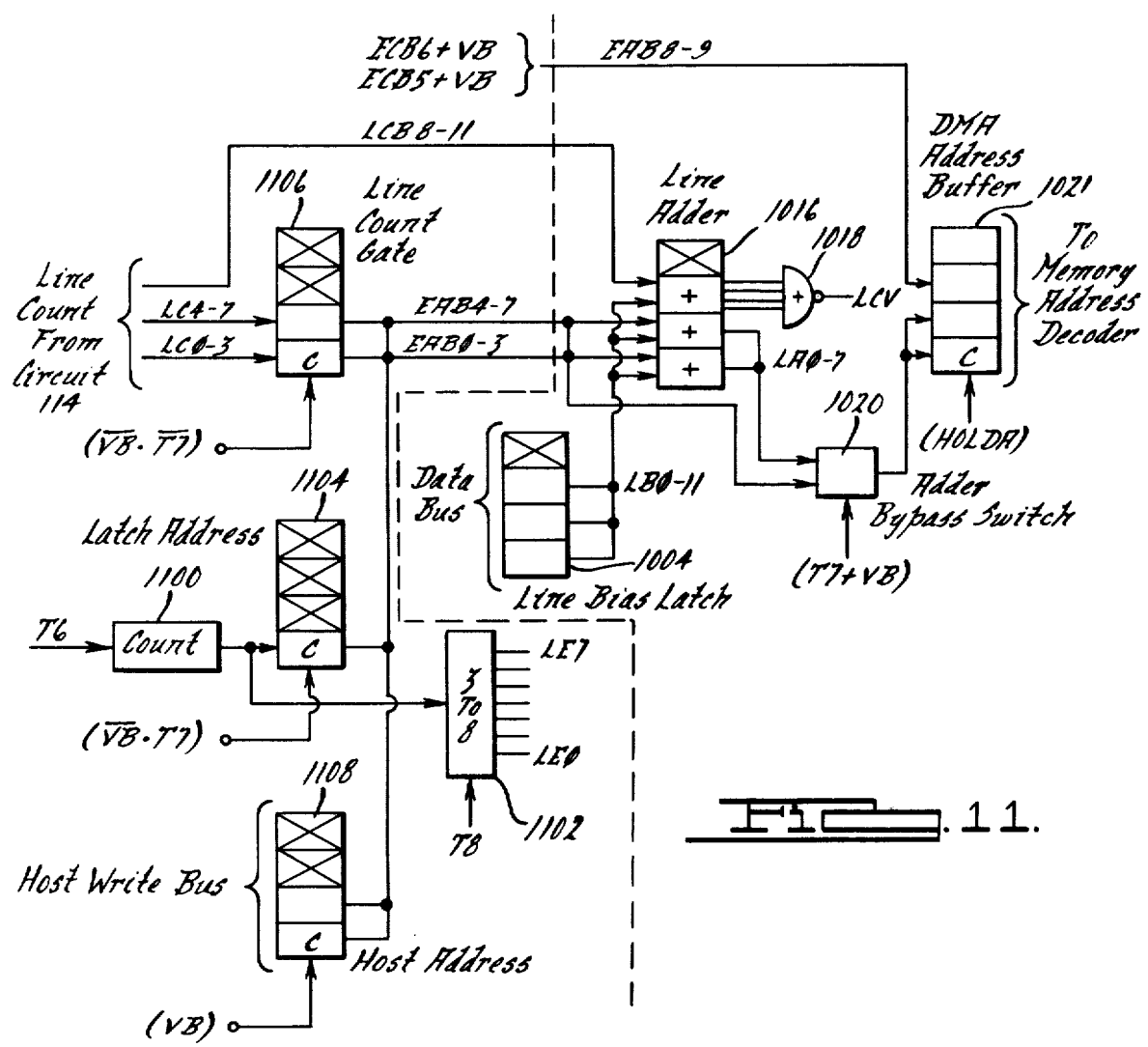
FIG. 11 is a still more detailed diagram of a portion of FIG. 10.

FIG. 11 discloses further details of the circuitry and is useful in explaining how the memory 502 is addressed so that the data stored in memory is correctly loaded into the latches of FIG. 10. In FIG. 11 those components to the right of the broken line have been disclosed in FIG. 10. Each object generator will contain this particular circuitry. In addition, there is provided the circuitry to the left of the broken line which is shared by all the object generators. This additional circuitry includes in addition to the counter 1100 and the decoder 1102, a latch address 1104, a line count gate 1106 and a host address 1108. The host address 1108 couples the host write bus with the external address bus EAB$\phi$-7. The host address 108 is enabled only during the vertical blanking period by the vertical blanking signal VB so that the host is thereby enabled to address the object generators only during the vertical blanking time. This means that the host can address the object generators only once per field.

Consideration is first given to addressing the memory for the purpose of loading the start, end, and color data into the latches from matrices 700, 702, and 704. The line count is used to address the memory so that data for the start, stop and color is entered into the latches 504, 506, 1006, and 1014 on a line-by-line basis. The line count is supplied via the buses designated LCB8-11, LC4-7, and LC$\phi$-3 as shown at the top left hand corner of FIG. 11. The bus LCB8-11 comes directly to line adder 1016. The other two buses, LC4-7, LC$\phi$-3 come to line count gate 1106. Line count gate 1106 is enabled when there is neither the T7 pulse nor the vertical blanking signal. Hence, the complete line count signal will be supplied to line adder 1016 except when the T7 pulse or the vertical blanking pulse occurs. This means that during the T1, T3 and T5 pulses, the line count from circuit 114 is supplied to line adder 1016. It will be observed that the adder bypass switch 1020 is controlled by the T7 and vertical blanking pulses such that when neither T7 nor vertical blanking occurs, the signal from line adder 1016 on the bus LA$\phi$-7 is conducted by the adder bypass switch to the DMA address buffer 1021.

It will be recalled that the ECB5, ECB6 signals are used to generate the T1, T3 and T5 signals. By coupling these signals on the bus EAB8-9 to the DMA address buffer 1021, these two bits may be used to address the particular matrix 700, 702, or 704. Thus, when both ECB5 and ECB6 are logic ones, matrix 700 is addressed; when ECB5 is logic "0" and ECB6 is logic "1", matrix 702 is addressed; and when ECB5 is "1" and ECB6 is "0", matrix 704 is addressed. The bits from adder bypass switch 1020 remain the same and hence serve to select information in each matrix 700, 702, 704 correlated to the particular line which is to be next generated. Thus, during the horizontal blanking pulse, matrices 700, 702, 704 are addressed in sequence with the appropriate data appearing in sequence on the data bus and being entered in the correct latch for generation of the next line. It will be recalled that the initialization at the beginning of each field will serve to address the correct memory location for the first line of each field and thereafter in increments of five lines.

Consideration is now given to addressing the memory for the purpose of loading the other latches. Loading of the other latches can occur it will be remembered, only during the T7 pulse. Thus, when the T7 pulse is given, line count gate 1106 will prevent the data on buses LC4-7 and LC$\phi$-3 from appearing on the external address bus lines EAB4-7 and EAB$\phi$-3. Instead, the contents of latch address 1104 are put on the EAB lines during the T7 pulse. The adder bypass switch is activated during the T7 pulse so that the line adder is bypassed and the data on the buses EAB4-7 and EAB$\phi$-3 is transmitted through to DMA address buffer 1021. Note now that the ECB5 and ECB6 signals have changed and are now "00". These two bits now address a further portion of memory where the other information is stored. The particular value of the count in counter 1100, as transmitted through to the DMA address buffer 1021, will select the particular data within this further portion of memory in such a manner that the correct information is loaded into the correct latch. Thus, for example, if it is assumed that the SCT No. 0 latch is to be loaded, the count in the counter 1100 will be addressing the location in memory which stores the SCT No. 0 latch information thereby causing that information to appear on the data bus D$\phi$-15. That same count in counter 1100 will also cause the LE1 signal to be generated when the T8 pulse occurs. Hence, the correct memory location has been addressed and the correct LE signal will be given to cause the correct information to be entered into the latch. The other latches are loaded in like fashion. Hence the addressing scheme which is utilized is now apparent. It should be pointed out that it may be necessary to employ a memory address decoder between the DMA address buffer 1021 and memory 502 if the memory address scheme for the particular memory utilized is not directly compatible with the line count signal received from circuit 114.

It should be noted in FIG. 11 that the vertical blanking signal serves to bypass the just described addressing circuitry so that only the host can address the memory during vertical blanking.

In light of the foregoing description, further features of the system of the present invention can now be better understood. First consideration will be given to scaling of an object. The scheme for storing an object in one of the object generators will provide a certain size of object on the screen. For convenience, the information as stored will produce the largest possible size of the object on the screen. Therefore, with the scaling feature hereinafter described, the object can be correspondingly reduced in size only. However, it would be possible to expand the object, if desired, by another scheme. The scaling scheme employed scales the object vertically by selectively omitting lines of the object. As the scale is progressively reduced, more and more lines are omitted. The number of lines to be omitted is determined by the range information which is supplied to the object generator from host computer 100. The greater the range, the smaller the object will appear. Thus, as the range increases, more and more lines of the object must be omitted. The omission of lines is accomplished by the object generator's own microprocessor acting upon the stored object information and the range information received from the host computer. Thus, when the object is scaled the data which appears on data bus D$\phi$-15 reflects the object having been already scaled. Horizontal scaling is accomplished in like fashion within the object generator by its own microprocessor so that the data appearing on the data bus will correspondingly change the element start and end points thereby reflecting the horizontal scaling of the object.

Positioning of an object on the screen is accomplished by adding line bias and element bias. In response to the position information received from the host computer for its object, the object generator determines if the object or any portion thereof is to be displayed. If this is determined to be the case, then the object generator calculates the amount of the line bias (i.e., vertical bias) and the amount of the element bias (i.e., horizontal bias) so that the object will appear in the correct position on the screen. The element bias is loaded into element bias latch 1002 and the line bias into line bias latch 1004. As explained above, element bias adder 1000 adds the element bias to each start and end element which is loaded into the element start and end latches 504 and 506. By adding the bias, horizontal positioning of each line is accomplished in the same amount whereby the object is horizontally positioned. Similarly, line adder 1016 adds the calculated line bias (which is made negative to shift the line downward) to the line count received via the line count bus whereby all lines are shifted vertically by the amount of the line bias to thereby vertically position the object. The over/under flow detector 1018 monitors for sums produced by the line adder 116 which exceed the allowable range of 0 to 255 lines. When the sum is outside this range, the line count valid (LCV) signal is not given; hence, only for line counts within the appropriate range is the line count valid signal given. By interlocking the other gates as shown with the LCV signal, generation of invalid lines is avoided and thus the integrity of the display is maintained.

It is now appropriate to consider the relationship between the line of sight and the overall scene as shown in FIG. 2. In FIG. 2 the overall scene was described as having horizontal and vertical dimensions of 65,536 elements and lines, respectively. The host computer assigns locations correlated to the overall scene to the individual object generators. As mentioned above, each object generator is identified by its own unique number and the host computer can address each object generator individually. The line of sight may be considered to define the field of view. By knowing the coordinate locations in the overall scene where the line of sight is at any instant of time it is possible to determine those objects which are within the field of view. However, it will be noted that the generation of the field of view on the display is predicated upon a field of view having 1280 elements and 1312 lines. Thus, it becomes necessary to convert from the position in the overall scene to the 1280 by 1312 format for the purpose of generating the field of view on the display. This is accomplished by means of calculations carried out by the individual microprocessors. Because the line of sight is located in the middle of the field of view it is more convenient from a computational technique standpoint to reference one corner of the 1280 by 1312 format, preferably the lower left hand corner and to use the coordinate location of that left hand corner (instead of the line of sight) for the purpose of converting the position within the overall scene into the 1280 by 1312 format. The coordinate format of scene 200 may have the 0,0 coordinate (i.e., the origin) at the lower left-hand corner with the positive x and y axes extending to the right and upward respectively from the origin. Thus, in carrying out the calculational techniques, the coordinate location of that corner of the field of view is subtracted from the coordinate positions of the objects in the overall scene to determine those objects and portions of objects which are within the 1280 by 1312 range of the field of view. If as a result of this subtraction, any object or portion thereof is within the 1280 by 1312 format, it will be displayed in the corresponding location on the display by the technique of the present system, as described above, except those portions which are blanked, per the blanking arrangement described earlier. In the scanning scheme of FIG. 3, the scan proceeds from left to right and from top to bottom. It will be noted in FIG. 6 that the lines of the object are numbered in increasing order from top to bottom. However, in the subtraction scheme just-described, the objects will be generated upside down if the foregoing subtraction scheme were utilized. Hence, in fact, the objects are stored in each object generator with the line numbers per the FIG. 7 format being in inverse order from that which is shown in FIG. 6. Thus, with this inversion, the objects will be displayed in the right-side-up position on the TV monitor.

As shown in FIG. 2, land and sky are generated with there being a horizon separating the two. These may be considered as background and hence will be assigned the lowest priority of all. A special type of object generator may be utilized to generate the sky and land as background. Rather than being limited to the 256 by 256 display, the land and sky object generators may be provided to be not interlocked with the element count and to be interlocked with the line count only to demarcate between land and sky at the horizon and to always call for their respective color information to appear on the color bus if no other object generator is calling for its color information to be displayed at the same line and element location.

Several additional signals shown in the drawings have not previously been described but should be apparent. Specifically, in FIG. 10, the inverter 519 provides the logic complement $\overline{CBE}$ of the color bus enable signal CBE. The Blanking signal of FIG. 4 is a hold request to the microprocessors. HOLDA is a response from a microprocessor indicating that it is no longer addressing the memory, which now allows the external address bus or the line count bus, as the case may be, to address the memory and extract data for the various latches.

Video display 112 has been referred to as a TV monitor and may comprise a standard color television set with the following modifications. The horizontal and vertical sweep generators are used, but instead of the horizontal and vertical sync signals of the set, the horizontal and vertical sync signals of the blanking and count generator 114 reset the sweep generators. The three color video amplifiers of the set are used, as is its power supply. Tuning and color demodulation of the set is completely bypassed. A conventional color set has a limited bandwidth response and cannot make use of the full capability of the 20 megahertz bandwidth of the color video signals which are generated by the disclosed system. Therefore, a higher bandwidth monitor may be used to obtain the full benefit of the capability of the object generation scheme disclosed above.

The host and microcomputer programs may be written in a machine language or in any higher language using known procedures appropriate for the actual host and microcomputers in use to execute the required computations hereinbefore described in real time. A suitable computer for the host is a general purpose minicomputer, such as a Computer Automation LSI 2/20. Alternatively, one or more microprocessors of similar type to those used in the object generators may be suitably interconnected and programmed to perform the functions required of the host computer.

What is claimed is:

1. In a computer-generated video display wherein a picture composed of objects is generated on the face of the display and the shape of each object is synthesized for electronic storage by defining the object as a series of parallel line segments each of which begins at one edge of the object and ends at an opposite edge of the object, the combination with said display of, a host computer;

a plurality of object generators, each associated with a corresponding object to be displayed, each object generator comprising a microprocessor and a memory;

means for transmitting assigned location data from the host computer to each object generator representing an assigned location for the associated object on the face of the display corresponding to its location in space;

the memory of each object generator comprising a pair of correlated storage matrices storing respective sets of data words wherein each data word of one matrix is correlated with a corresponding data word of the other matrix and each data word of the one matrix represents the beginning, and the correlated data word of the other matrix the end, of a corresponding one of the lines synthesizing the associated object;

a line and element count generator for generating line and element counts corresponding to line and element locations on the face of the display;

means supplying line and element counts from the line and element count generator to each object generator;

means for synchronizing the display with counts of the line and element count generator;

the microprocessor of each object generator comprising means for processing the assigned location data received from the host computer along with the data words in the two matrices of its associated memory to develop pairs of correlated start and end element location data words with each pair of start and end element location data words being correlated to a particular line count;

each object generator further comprising a start element latch and an end element latch and means responsive to each new line count from the line and element count generator for causing the start and end element latches to be respectively loaded with the respective start and end element location data words developed by the microprocessor which are correlated with the new line count; and means comparing the element count with the start and end element location data words in the respective start and end element latches during each new line count and causing a corresponding line of the object to be generated on the face of the display during the interval beginning when a predetermined relationship is attained between the element count and the start element location data word in the start element latch and ending when a predetermined relationship is attained between the element count and the end element location data word in the end element latch.

2. In a computer-generated video display wherein a picture composed of objects is generated on the face of an electron beam display tube controlled by horizontal and vertical sweeps developing a sweep pattern in the form of a series of vertically spaced, horizontal sweep lines with beam intensity being modulated along sweep lines and wherein the shape of each object is synthesized for electronic storage by defining the object as a series of parallel line segments each of which begins at one edge of the object and ends at an opposite edge of the object, the combination with said display of, a host computer;

a plurality of object generators each associated with a corresponding object to be displayed, each object generator comprising a microprocessor and a memory;

means for transmitting assigned location data from the host computer to each object generator representing an assigned location for the associated object on the face of the display corresponding to its location in space;

the memory of each object generator comprising a pair of correlated storage matrices storing respective sets of data words wherein each data word of one matrix is correlated with a corresponding data word of the other matrix and each data word of the one matrix represents the beginning, and the correlated data word of the other matrix the end, of a corresponding one of the lines synthesizing the associated object;

a line and element count generator for generating line and element counts corresponding to line and element locations on the sweep pattern;

means supplying line and element counts from the line and element count generator to each object generator;

means for synchronizing the respective vertical and horizontal sweeps of the electron beam with the respective line and element counts of the line and element count generator;

the microprocessor of each object generator comprising means for processing the assigned location data received from the host computer along with the data words in the two matrices of its associated memory to develop pairs of correlated start and end element location data words with each pair of start and end element location data words being correlated to a particular line count;

each object generator further comprising a start element latch and an end element latch and means responsive to each new line count from the line and element count generator for causing the start and end element latches to be respectively loaded with the respective start and end element location data words developed by the microprocessor which are correlated with the new line count; and means comparing the element count with the start and end element location data words in the respective start and end element latches during each new line count and causing the electron beam to generate a corresponding line of the object along a corresponding sweep line on the face of the display tube during the interval beginning when a predetermined relationship is attained between the element count and the start element location data word in the start element latch and end when a predetermined relationship is attained between the element count and the end element location data word in the end element latch.

3. In a computer-generated video display wherein a picture composed of objects is generated on the face of the display and the shape of each object is synthesized for electronic storage by defining the object as a series of parallel line segments each of which begins at one edge of the object and ends at an opposite edge of the object, the combination with said display of, a host computer;

a plurality of object generators, each associated with a corresponding object to be displayed, each object generator comprising a microprocessor and a memory;

means for transmitting assigned location data from the host computer to each object generator representing an assigned location for the associated object on the face of the display corresponding to its location in space;

the memory of each object generator comprising a pair of correlated storage matrices storing respective sets of data words wherein each data word of one matrix is correlated with a corresponding data word of the other matrix and each data word of the one matrix represents the beginning, and the correlated data word of the other matrix the end, of a corresponding one of the lines synthesizing the associated object;

a line and element count generator for generating line and element counts corresponding to line and element locations on the face of the display;

means supplying line and element counts from the line and element count generator to each object generator;

means for synchronizing the display with the respective line and element counts of the line and element count generator;

the microprocessor of each object generator comprising means for processing the assigned location data received from the host computer along with the data words in the two matrices of its associated memory to develop pairs of correlated start and end element location data words with each pair of start and end element location data words being correlated to a particular line count;

each object generator comprising circuit means responsive to each successive line count for latching the corresponding correlated start and end element location data words and during each line count for comparing the latched location data words with the element count and causing the corresponding line of the object to be generated on the face of the display during the time that the element count is within a range corresponding to that between the latched location data words.

4. In a computer-generated video display wherein a picture composed of objects is generated on the face of the display and the shape of the each object is synthesized for electronic storage by defining the object as a series of parallel line segments each of which begins at one edge of the object and ends at an opposite edge of the object, the combination with said display of, a host computer;

a plurality of object generators, each associated with a corresponding object to be displayed, each object generator comprising a microprocessor and a memory;

means for transmitting assigned location data from the host computer to each object generator representing an assigned location for the associated object on the face of the display corresponding to its location in space and also priority data representing priority relative to that of other objects;

the memory of each object generator comprising a pair of correlated storage matrices storing respective sets of data words wherein each data word of one matrix is correlated with a corresponding data word of the other matrix and each data word of the one matrix represents the beginning, and the correlated data word of the other matrix the end, of a corresponding one of the lines synthesizing the associated object;

a line and element count generator for generating line and element counts corresponding to line and element locations on the face of the display;

means supplying line and element counts from the line and element count generator to each object generator;

means for synchronizing the display with counts of the line and element count generator;

the microprocessor of each object generator comprising means for processing the assigned location data received from the host computer along with the data words in the two matrices of its associated memory to develop pairs of correlated start and end element location data words with each pair of start and end element location data words being correlated to a particular line count;

a video signal bus common to all object generators;

each object generator further comprising a start element latch and an end element latch and means responsive to each new line count from the line and element count generator for causing the start and end element latches to be respectively located with the respective start and end element location data words developed by the microprocessor which are correlated with the new line count; and means comparing the element count with the start and end element location data words in the respective start and end element latches during each new line count and providing video output signals during the interval beginning when a predetermined relationship is attained between the element count and the start element location data word in the start element latch and ending when a predetermined relationship is attained between the element count and the end element location data word in the end element latch;

a priority comparison network coupling all object generators which is effective, for each line and element count combination, to transmit onto the video signal bus, the video output signal from only that object generator which has the highest assigned priority of all object generators which for that line and element count combination have video output signals;

and means for causing the video signal appearing on the video signal bus to be converted into visible form at the coordinate location on the face of the display corresponding to the corresponding line and element count combination.

5. A computer-generated video display comprising:

a video display;

a host computer;

a plurality of object generators, each object generator comprising a microprocessor and a memory, each object generator being assigned a selected object for display, with object shape data representing shape of the object being stored in the associated memory;

a line and element count generator for generating line and element counts representing line and element coordinate locations on the video display; means supplying line and element counts from said line and element count generator to each object generator;

means transmitting assigned priority and location data from the host computer to each object generator representing assigned priority and location for each object on the video display;

the microprocessor of each object generator comprising means processing the corresponding location data received from the host computer along with the object shape data stored in the associated memory to develop object output data correlated to selected line and element count coordinates representing corresponding coordinate locations on the video display;

a video signal bus common to all object generators, each object generator comprising means responsive to each line and element count combination for which the object generator has corresponding object output data for providing a corresponding video output signal;

a priority comparison network coupling all object generators which is effective, for each line and element count combination, to transmit onto the video signal bus, the video output signal from only that object generator which has the highest assigned priority of all object generators which for that line and element count combination have video output signals;

and means for causing the video signal appearing on the video signal bus to be converted into visible form at the coordinate location on the video display corresponding to the corresponding line and element count combination.

6. In a computer-generated video display wherein a picture composed of objects is generated on the face of the display and the shape of each object is synthesized for electronic storage by defining the object as a series of parallel line segments each of which begins at one edge of the object and ends at an opposite edge of the object, the combination with said display of,
- a host computer;
- a plurality of object generators, each associated with a corresponding object to be displayed, each object generator comprising a microprocessor and a memory;
- means for transmitting assigned location data from the host computer to each object generator representing an assigned location for the associated object on the face of the display corresponding to its location in space;
- the memory of each object generator comprising a set of pairs of correlated data words wherein each pair of data words defines a corresponding one of the lines synthesizing the associated object;
- a line and element count generator for generating line and element counts corresponding to line and element locations on the face of the display;
- means supplying line and element counts from the line and element count generator to each object generator;
- means for synchronizing the display with the respective line and element counts of the line and element count generator;
- the microprocessor of each object generator comprising means for processing the assigned location data received from the host computer along with the pairs of correlated data words in its associated memory to develop corresponding pairs of control data words defining a corresponding line of the object in the desired location on the face of the display;
- each object generator comprising a pair of circuit devices which may be loaded with data words, means operable at each line count for loading corresponding pairs of control data words into the pair of circuit devices, and means coupling the circuit devices, the count generator, and the display for causing the corresponding line of the object to be generated on the face of the display as the element count proceeds over a range corresponding to the line definition provided by the control data words in the circuit devices.

* * * * *